Figure 1:
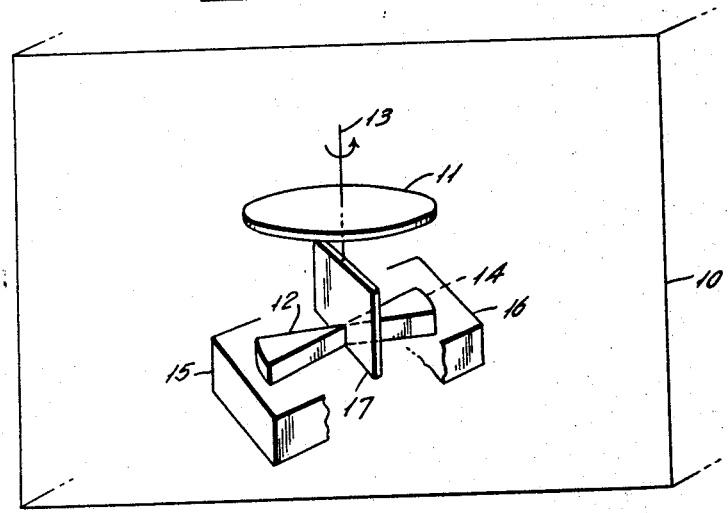

March 3, 1964  R. A. BOLOMEY ETAL  3,123,489
METHOD FOR PREPARING NACREOUS PIGMENTS
Filed Feb. 6, 1961

INVENTORS
RENÉ A. BOLOMEY
HAROLD A. MILLER
LEON M. GREENSTEIN
BY
OSTROLENK, FABER, GERB & SOFFEN
ATTORNEYS 3,123,489
METHOD FOR PREPARING NACREOUS PIGMENTS
René A. Bolomey, Peekskill, Harold A. Miller, White Plains, and Leon M. Greenstein, Brooklyn, N.Y., assignors to Francis Earle Laboratories, Inc., Peekskill, N.Y., a corporation of New York
Filed Feb. 6, 1961, Ser. No. 87,062
12 Claims. (Cl. 106—291)

This invention deals with the production of nacreous pigments by a vacuum evaporation process.

Nacreous pigments are substances which produce a nacreous or pearl-like effect when incorporated in transparent substances like plastics or when applied to surfaces in the form of a paint or lacquer coating. Everyday commercial examples of these uses are seen in simulated pearl shirt buttons, in which nacreous pigments are incorporated in polyester resin or polymethyl methacrylate plastic, and in simulated pearls, in which a lacquer coating containing nacreous pigment is applied to a glass or plastic bead.

The properties of a nacreous pigment are derived from the shape and index of refraction of the pigment particle. This particle must be in the shape of a thin plate and must have an index of refraction different from that of the transparent substance in which the platelet is used. The conventional transparent substances in which nacreous pigments are incorporated have indices of refraction in the range of approximately 1.50 to 1.60, such substances including cellulose nitrate, cellulose acetate, polyvinyl chloride and acetate and their copolymers, polyester resins, polyacrylic resins, epoxy resins, polyethylene, polypropylene, polystyrene, phenol formaldehyde resins and amine formaldehyde resins.

The currently known nacreous pigments consist of either crystalline or non-crystalline platelets of high index of refraction. These include natural guanine crystals derived from fish (high index of refraction, about 1.85), basic lead carbonate (high index, 2.09), lead hydrogen phosphate (high index, about 1.84), bismuth oxychloride (high index, above 2.0), and glass platelets of index of refraction of 1.80 and higher. Except for guanine, the chemical compounds are synthetic and are crystallized in the form of plates during production. Guanine is obtained as a crystalline platelet from fish. Glass is shaped into platelets by mechanical means.

The physical properties responsible for nacreous luster are, as has been indicated, the particle shape and the index of refraction. The shape makes it possible to orient the plates parallel to one another in a surface coating or within a plastic, since any kind of flow during processing causes the platelets to arrange themselves in parallel layers. An index of refraction different from the incorporating transparent substance assures the reflection of light from the platelet surface. The nacreous luster arises from the simultaneous reflection of light from numerous parallel surfaces. For practical utility, it can be considered that the long dimension of the platelet should be at least four times and preferably at least ten times its thickness and that the index of refraction of the platelet should be at least 0.2 different from the supporting medium. The particles of all the nacreous pigments described above have these characteristics.

Aside from these essential properties, nacreous pigment particles for practical use must share a number of other properties; these include insolubility in the plastics and coating materials in which the platelets are used, adequate heat stability to withstand the temperatures encountered in plastics processing, freedom from chemical reactivity with plastics and coating formulations, and so on. The nacreous pigments mentioned above all perform well in these respects.

A further optical property of some nacreous pigments is the production of color by means of light interference phenomena. This occurs when the thickness of the pigment platelet is such that interference effects are obtained between reflections from the two parallel faces of the platelet.

Many substances have all of the desired properties, with the exception of platelet shape. Among these are the high index of refraction substances zinc oxide, zinc sulfide, synthetic guanine and xanthine, titanium dioxide, zirconium oxide and lead chloride; and the low index of refraction substances magnesium fluoride, calcium fluoride and cryolite ($Na_3AlF_6$). The latter, which have indices of refraction less than 1.4 are especially suitable for use in light-transmitting plastic substances of higher index, such as polystyrene, and can be made into useful nacreous pigments by the evaporation process described herein.

One method for converting vaporizable substances in to platelets by vacuum sublimation or evaporation has been described in United States Patent No. 2,713,004. In this procedure, a thin layer of the substance of suitable refractive index is coated by sublimation onto a substrate consisting of a resin or plastic surface. The evaporated film is removed by dissolving the substrate in a convenient solvent the film then being broken into platelets of the desired average size by mechanical fragmentation.

This procedure has certain disadvantages in that an extremely extensive surface must be coated for the preparation of a given quantity of nacreous pigment. It is necessary to cover 250 square meters of surface to produce 100 grams of nacreous pigment particles with a thickness of 100 millimicrons, taking the specific gravity of the evaporated film to be 4.0.

In the present invention the necessary surface area is vastly reduced by creating new substrate while the nacreous pigment film is being deposited. This is accomplished by evaporating two substances simultaneously onto different portions of a moving surface, such as a rotating disc, an endless belt or a surface which reverses direction, thus producing alternating layers of substrate and pigment.

The pigment, as has been mentioned above, is a substance which is insoluble in many liquids; the substrate is a vaporizable substance which is readily soluble in a liquid in which the pigment is insoluble. The layers of nacreous pigment film are thus readily separated from each other and from the substrate simply by the addition of a liquid which dissolves the substrate film. Among the substrate substances which can be used effectively with the nacreous pigment substances already named are alkali halides, e.g., sodium chloride, potassium chloride, sodium bromide; alkali metal borates, e.g., sodium tetraborate, potassium tetraborate; boric acid; and alkaline earth halides, e.g., magnesium chloride, calcium chloride and calcium bromide.

The alternating films are referred to above as substrate films and nacreous pigment films, respectively, although it should be understood that the "pigment film" is not properly in the form of nacreous pigment particles until after separation from the substrate and fragmentation to the appropriate size range.

It is obvious that the requirement for 250 square meters of surface for a 100 millimicron film weighing 100 grams is reduced to 2.5 square meters by building up 100 layers of pigment film with 100 layers of substrate, or to 0.25 square meter for 1,000 layers each. The requirement for surface area is thus rapidly reduced to feasible proportions.

The double evaporation method is extremely convenient because the multiple layering is accomplished without interferring with or breaking the vacuum, the heat supplied to each of the vaporizing substances being adjusted to give a film of the desired thickness under the same pressure conditions.

The heat supplied should be sufficient to cause evaporation of the pigment substance under the particular vacuum conditions. Vacuum is generally maintained at a pressure of $10^{-2}$ mm. or lower.

In the manufacture of the nacreous pigments by vacuum evaporation techniques, the thickness of the pigment film is very small. More reflections can be obtained from a given mass of nacreous pigment material if the substance is in the form of thin platelets than if it should be in the form of thicker platelets.

Where color effects are desired through interference phenomena, other considerations enter into the determination of the desirable film thickness.

The interference phenomena utilized in the formation of color in this invention depend on the fact that the particle obtained by fragmentation of a thin film of desirable thickness retains the optical characteristics of a thin film. When white light is reflected by such a film, the rays from the two surfaces may interact, resulting in the reinforcement of or the destruction of light of certain wave lengths. A change in the composition of the light, brought about by such reinforcement or destruction, produces color.

Thus, the familiar equations which govern the color effects depend on the index of refraction of the thin film or platelet and, for non-perpendicular incidence, the index of refraction of the surrounding medium. Destructive interference occurs if the reflections from the two opposed surfaces of the platelet are completely out of phase. This is the case for wavelength λ (for light perpendicularly incident on the film when $$d=(n-1)\lambda/2N$$

where "$d$" is the thickness of the film whose index of refraction is "$N$" and "$n$" is the order of the reflection.

If the incident light of wavelength λ is monochromatic, there is no reflection at all under these conditions. If on the other hand, the platelet is illuminated by white light, all wavelengths except λ appear in the reflection. Reinforcement of wavelength λ occurs when $$d=(2n-1)\lambda/4N$$

for perpendicular incidence. In this case the reflected light is particularly rich in the wavelength being reinforced.

For uncolored nacreous pigment the value of $Nd$ where $d$ is the thickness of the film in millimicrons and $N$ is the index of refraction of the film should fall in the range from about 10 to about 200. This means, for a substance of index of refraction 2.0, that the preferred thickness range is from about 5 to about 100 millimicrons. The platelets which result from these films reflects essentially white light, being below the thickness which produces intense interference effects. However, uncolored nacreous pigments can be obtained for much higher values of $Nd$ if the film is sufficiently heterogeneous in thickness so that the interference color which arises from one particle of fragmented film is neutralized by the color from another, but the nacreous effect of such material is not as good as that which falls within the stated preferred range.

Interference colors are produced when the value for $Nd$ falls in the range 200 to approximately 2500, the most intense colors from a given concentration of pigment, by weight, occurring in the range 200 to approximately 1500. The intensity of the color further depends on the uniformity of platelet thicknesses since platelets of different thickness would reflect different colors which would tend to neutralize one another. Moreover, the platelets should have smooth, parallel surfaces as can be readily obtained by the vacuum evaporation process described herein. As a practical criterion it may be considered that a minimum of about 80 percent of the total platelet area after fragmentation should not differ in thickness by more than ±10 percent of the average platelet thickness. It is obvious that even greater homogeneity is desirable; the preferred criteria are, therefore, a minimum of about 90 percent of the total crystal plate area differing in thickness by not more than ±5 percent of the average platelet thickness.

The thickness of the substrate film is a matter of convenience. Thin films utilize less material, but this factor is not of primary importance since the substrate substance can be recovered and re-used. In practice, it is convenient to use a substrate film thickness which is similar to the pigment film thickness.

The addition of solvent for the substrate, e.g., water in the case where NaCl is the substrate and ZnS the pigment film, generally causes the pigment film to break up into small flakes.

The long dimension of the pigment particle is controlled by mechanical fragmentation of the flakes which form when the substrate is dissolved away. For nacreous or color effects which appear continuous to the eye, the flakes should be smaller than can generally be seen individually, but must be large enough to maintain a suitable ratio of length to thickness. The suspension or slurry of pigment flakes in liquid is easily reduced to the desired platelet size by conventional milling techniques. A size range of 2 to 100 microns is suitable for most purposes, optimum luster being in the region of 8 to 50 microns. Larger flakes may be used for special purposes. These will be visible as discrete flakes which have uniform color by reflected light.

Platelets of different dimensions may be separated by conventional classifying and sorting techniques.

The resulting nacreous pigment can be dried or can be kept in a liquid form convenient for use. Thus the aqueous slurry can be used directly in latex systems. For resin and lacquer systems in which water is undesirable, the slurry can be filtered and the water replaced by a suitable water-miscible solvent, such as alcohol, the methyl ether of ethylene glycol, or acetone. Conventional pigment flushing techniques for transferring the pigment into organic vehicles may also be used. Among the conventional vehicles or supporting media which can be employed are cellulose nitrate or cellulose acetate, lacquer plasticizers such as dibutyl phthalate or dioctyl phthalate and oils such as linseed or castor oil.

Another technique for preparing the flakes in an organic medium is to use an alcohol- or acetone-soluble substrate material, such as magnesium chloride or calcium bromide. The nacreous pigment particles are introduced directly into the organic liquid by using this liquid to break up the layered film structure.

In the case of platelets of interference thickness the color which is produced is different from that which can be obtained by the use of conventional dyes and pigments because two colors are produced at one time, one by reflection, the other by transmission. If, for example, destructive interference of green takes place on reflection by the platelet, the color of the reflected light consists of the composite of all the residual wavelengths, and is reddish, i.e., magenta or purple. The light transmitted by the plate, on the other hand, is green, consisting in large part of the wavelength which was "destroyed" by reflection. Thus, the reflected and transmitted colors are complementary to one another, making possible two-color or "iridescent" effects.

Figure 2:
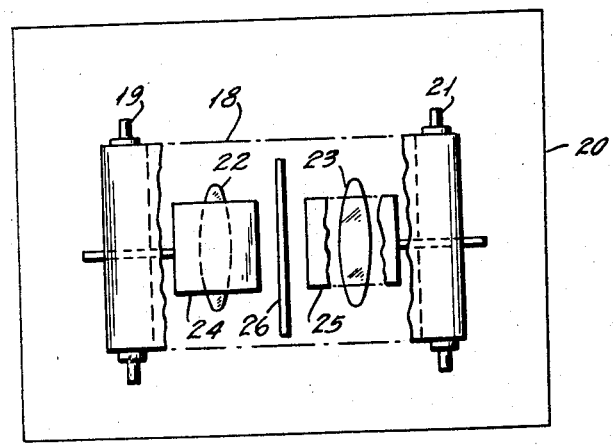

The nature of the present invention will be made apparent from a consideration of the following non-limiting examples illustrating the practice thereof, taken in connection with the accompanying drawing in which:

FIGURE 1 is a schematic perspective view of an apparatus for performing the method described in Example I below; and FIGURE 2 is a schematic plan view of an apparatus for performing the method described in Example II below:

*Example I*

As illustrated in FIGURE 1 a rotating polished steel disc 11, suitably 25 inches in diameter, is mounted in a horizontal position within a vacuum chamber 10. Solid $Na_2B_4O_7$, the substrate material, is placed in a sector-shaped ceramic boat 12 which, as shown, is supported in position under the disc, the vertex of the boat pointing to the axis of rotation 13 of the disc 11. The top of the boat 12 is positioned about 4 inches below the disc.

Solid ZnS, which is to be made into nacreous pigment particles, is placed in a similar boat 14 below the disc 11 in a position symmetrical with boat 12 diametrically opposed to it.

Boat 12 is heated by an electric furnace 15 and boat 14 by an electric furnace 16, the entire assemblage being in the vacuum chamber 10. The disc 11 is protected by shields manipulated from outside the vacuum chamber 10 (the shields have been omitted from the drawing for purposes of simplification), which shields prevent premature deposition upon the disc 11 while the evaporation rates are adjusted. A permanent shield 17 is in a vertical position close to the axis of rotation 13 of the disc 11 to prevent intermixing of the vapors.

Heat is applied to the two boats with the apparatus pumped down to a pressure of approximately $5 \times 10^{-5}$ mm. mercury and with the shields in place. The disc rotates at approximately 30 r.p.m.

After steady evaporation rates are attained, the movable shields are pulled aside, and the apparatus is run for 60 minutes during which 1800 layers of $Na_2B_4O_7$ alternating with 1800 layers of ZnS are deposited. The ZnS film has a thickness of approximately 50 m$\mu$, the $Na_2B_4O_7$ film a thickness of approximately 30 m$\mu$.

After cooling and breaking the vacuum, the disc is removed and washed with approximately 1 liter of water at ambient temperature. The nacreous pigment film (approximately 117 grams ZnS) flakes off as the $Na_2B_4O_7$ dissolves. The rather large flakes are reduced to an average diameter of 25 microns by passing the suspension through a colloid mill.

The nacreous pigment particles are filtered, washed borate-free with water, and water-free with isopropanol. After incorporation in a cellulose nitrate lacquer, their nacreous effect is demonstrated by coating alabaster glass beads to make simulated pearls.

*Example II*

As shown in FIGURE 2 of the drawing, an endless belt 18 made of 5 mil polyester film 12 inches wide moves on two parallel horizontal rollers 19 and 21 of six inch diameter which are 24 inches apart, axis to axis, in a vacuum chamber 20. Solid NaCl is placed in a narrow ceramic boat 22 suitably 10 inches in length, which is mounted (with its long dimension parallel to the roller axes) about 5 inches below the bottom surface of the belt 18 and ¼ of the distance between the rollers 19 and 21.

Solid ZnS is placed in a similar boat 23 under the belt 18 and arranged symmetrically with the NaCl boat 22. The ZnS boat is thus parallel to the NaCl boat but is closer to the roller 21.

Boat 22 is protected by a shield 24 and boat 23 by a shield 25 which can be manipulated from the outside vacuum chamber 20 to prevent premature deposition on the belt 18. A further shield 26 is disposed in a vertical position midway between the two ceramic boats 22 and 23 and is kept in place during the run to prevent intermixing of the vapors.

The apparatus is pumped down to a pressure of approximately $10^{-4}$ mm. of mercury, and the belt is set moving at a linear rate of about 500 inches per minutes. After several minutes heating, during which steady evaporation rates are attained, the protective shields are removed, and the belt is coated for 60 minutes during which 600 alternating layers each of ZnS and NaCl are deposited. The ZnS film has a thickness of approximately 75 m$\mu$ and the NaCl film a thickness of approximately 100 m$\mu$.

After cooling and bringing to atmospheric pressure the resulting ZnS nacreous pigment film is removed with water and is washed and fragmented as in Example I.

*Example III*

The process of Example I is repeated with the deposition of a ZnS film (index of refraction approximately 2.2) and a thickness of about 118 m$\mu$, making the value of N$d$ 260.

The rather large, red-reflecting flakes which are reduced to an average diameter of 25 microns by passage through a colloid mill. After the subsequent washing steps, the particles are incorporated in a cellulose nitrate lacquer with nacreous and color effects being demonstrated, by coating alabaster glass beads to make simulated pearls which are green with a red highlight. Green, the transmission color, appears because (except for the highlight) the observed light is reflected from the bead and passes through the platelet layer.

*Example IV*

Zinc oxide nacreous pigment is prepared by the method of Example I, using $MgCl_2$ as substrate.

*Example V*

Zinc oxide nacreous pigment is prepared as in Example II with $B_2O_3$ as the substrate material.

*Example VI*

Guanine nacreous pigment is prepared as in Example II with $Na_2B_4O_7$ as substrate.

*Example VII*

Titanium dioxide nacreous pigment is prepared as in Example II, with $Na_2B_4O_7$ as substrate.

*Example VIII*

$MgF_2$ nacreous pigment is prepared as in Example I, with $B_2O_3$ as substrate. The flakes are fragmented as described in Example I and are dried after being washed boric acid-free. The dried flakes are incorporated in polystyrene plastic by conventional mixing and molding techniques to prepare pearl polystyrene articles.

*Example IX*

Green-reflecting zinc sulfide is prepared by the method of Example I. The ZnS film has an index of refraction of approximately 2.2, and a thickness of approximately 296 m$\mu$ making the value of N$d$ 650. A simulated pearl prepared from this pigment is reddish with a green highlight.

The example demonstrates the production of color by reinforcement of the second order green reflection. The use of the higher order produces a more intense color per platelet, but this advantage is somewhat reduced in that there are fewer reflecting surfaces in a given weight of pigment because of the greater plate thickness.

Example X

Blue-reflecting zinc oxide nacreous pigment is prepared by the method of Example II, using $MgCl_2$ as substrate. The zinc oxide has an index of refraction of approximately 1.9 and a thickness of approximately 153 m$\mu$, making the value of N$d$ 290. A simulated pearl prepared from this nacreous pigment is yellow with a blue highlight.

Example XI

Green-reflecting guanine nacreous pigment is prepared as in Example II with NaCl as substrate. The guanine film has an index of refraction of approximately 1.8 and a thickness of 180 m$\mu$, making the value of N$d$ 324. A simulated pearl prepared from this green pigment is red with a green highlight; the colors are subtle and very closely resemble those of the oyster pearl or cultured pearl.

Example XII

Red-reflecting titanium dioxide nacreous pigment is prepared as in Example II, with NaCl as substrate. The titanium dioxide film has an index of refraction of approximately 2.4 and a thickness of 108 m$\mu$, making the value of N$d$ 260. A simulated pearl prepared from this red pigment is green with a red highlight.

Example XIII

Gold- or yellow-reflecting $MgF_2$ nacreous pigment is prepared as in Example II, with $B_2O_3$ as substrate. The $MgF_2$ film has an index of refraction of about 1.35 and a thickness of about 163 m$\mu$, making the value of N$d$ 220. The flakes are fragmented as described in Example I and are dried after being washed boric acid-free. The dried flakes are incorporated in polystyrene plastic by conventional mixing and molding techniques to prepare pearl polystyrene articles which are golden by reflected light and blue-violet by transmitted light.

It is apparent from the foregoing that the quantity of heat supplied to the nacreous pigment material and to the substrate material must be such as to produce the desired film thickness with the belt, disc, or other device moving at a particular velocity. The actual rate of heating is determined by the specific geometry of the assembly as well as by the rate of motion and the desired film thickness.

The temperatures used are naturally dependent on the temperature at which the particular pigment-forming substance or substrate material evaporates, which typically would be about 1300° C. for ZnS and $MgF_2$, 250° C. for guanine, 150° C. for sodium tetraborate and 500° C. for NaCl.

As mentioned previously, the range of nacreous pigment film thickness is determined by N$d$ values from about 10 to about 200 where the pearlescent effect is the prime consideration, and, where interference colors are desired, by N$d$ values in the range of 200 to 2500. For ZnS with an index of refraction of about 2.2 to 2.3, the preferred film thickness range for the uncolored pearlescent effect is from about 5 m$\mu$ to about 90 m$\mu$; for guanine with an index of refraction of about 1.8, the preferred thickness range is from about 6 m$\mu$ to about 110 m$\mu$; for $MgF_2$ with an index of refraction of about 1.38, the preferred range is from about 8 to about 150 m$\mu$. Thicker films are used where interference colors are sought.

The nacreous films deposited by the vacuum evaporation method tend to be amorphous, and, therefore, generally have somewhat lower indices of refraction than the same chemical compound would have in a crystalline form. This is an asset with substances of index of refraction of 1.40 or below, where the lowness of the index may be utilized. On the other hand, the indices of refraction of high index compounds can be made higher by causing the materials in the platelet to crystallize by known means, such as by heating the dried films or platelets.

The surface upon which the films are deposited should be inert to the substances being deposited, is preferably a smooth surface and typically would be a rotating disc of stainless steel, glass or brass, or an endless belt of cellulose acetate, cellulose, polyfluorocarbon, polyethylene, or a polyester film. The plastic film surface may be modified, if desired, by metallizing, e.g., coating with aluminum or other metal by evaporation.

In the foregoing, the present invention has been described only in connection with preferred embodiments thereof. Many variations and modifications of the principles of this invention within the scope of the description herein are obvious. Accordingly, the invention is to be limited not by the specific disclosure herein but only by the appending claims.

We claim:

1. A method for the preparation of a nacreous composition comprising enclosing a vaporizable nacre-producing pigment in an evacuated space, simultaneously heating said pigment and a vaporizable inorganic metal salt substrate therefore to temperatures at which said pigment and said substrate evaporate, depositing a thin film of said nacre-producing pigment and said substrate alternately on a moving surface sufficiently cool to condense alternate thin films of both said nacre-producing pigment and said substrate, dissolving said substrate in a liquid which is a solvent for said substrate and a non-solvent for said nacre-producing pigment, and then removing said nacre-producing pigment from said surface and fragmenting same to form nacreous pigment particles.

2. The method as defined in claim 1 including the further step of incorporating the fragmented nacreous pigment particles in a light-transmitting liquid vehicle.

3. The method of claim 1 in which the nacreous pigment is zinc sulfide.

4. The method of claim 1 in which the nacreous pigment is zinc oxide.

5. The method of claim 1 in which the nacreous pigment is guanine.

6. The method of claim 1 in which the nacreous pigment is magnesium fluoride.

7. The method of claim 1 in which the nacreous pigment is titanium dioxide.

8. The method of claim 1 in which the substrate is selected from the group consisting of alkali halides, alkaline earth halides and alkali borates.

9. The method of claim 1 in which the multiplication product of thickness expressed in millimicrons, and the index of refraction of the nacreous pigment particles is between 10 and 200.

10. The method of claim 1 in which the multiplication product of thickness expressed in millimicrons, and the index of refraction of the pigment particles is in excess of 200, thereby producing color by interference phenomena.

11. A method for the preparation of a nacreous composition comprising enclosing a nacre-producing material selected from the group consisting of zinc oxide, zinc sulfide, guanine, xanthine, titanium dioxide, zirconium oxide, lead chloride, magnesium fluoride, calcium fluoride and cryolite in an evacuated space, simultaneously heating said material and a substrate therefor selected from the group consisting of alkali metal halides, alkali metal borates and alkaline earth halides to temperatures at which said material and said substrate evaporate, depositing a thin film of said nacre-producing material and said substrate alternately on a moving surface sufficiently cool to condense alternate thin films of both said nacre-producing material and said substrate, dissolving said substrate in a liquid which is a solvent for said substrate and a non-solvent for said nacre-producing material, and then removing said nacre-producing material from said surface and fragmenting same to form nacreous pigment particles.

12. The method for preparing nacreous zinc sulfide comprising enclosing solid zinc sulfide in an evacuated space, simultaneously heating said zinc sulfide and an alkali tetraborate substrate therefore to temperatures at which said zinc sulfide and said substrate evaporate, depositing a thin film of said zinc sulfide and said substrate alternately on a moving surface sufficiently cool to condense alternate thin films of both said zinc sulfide and said substrate, dissolving said substrate in a liquid which is a solvent for said substrate and a non-solvent for said zinc sulfide, and then removing said zinc sulfide from said surface, fragmenting same to form zinc sulfide nacreous pigment particles, and then incorporating said particles in a light-transmitting supporting medium having an index of refraction which differs from that of the particles by at least 0.2.

References Cited in the file of this patent

UNITED STATES PATENTS

| | | |
|---|---|---|
| 2,405,662 | McManus et al. | Aug. 13, 1946 |
| 2,555,224 | Decker | May 29, 1951 |
| 2,712,190 | Sobel | July 5, 1955 |
| 2,713,004 | Greenstein | July 12, 1955 |
| 2,863,783 | Greenstein | Dec. 9, 1958 |
| 2,950,981 | Miller et al. | Aug. 30, 1960 |
| 3,008,844 | Grunin et al. | Nov. 14, 1961 |

OTHER REFERENCES

Lange's Handbook of Chemistry, Ninth Edition, 1956, page 168.

Mellor, volume 3, 1923, page 688.